US008837068B1

(12) United States Patent
Liao et al.

(10) Patent No.: US 8,837,068 B1
(45) Date of Patent: Sep. 16, 2014

(54) TWO DIMENSIONAL MAGNETIC RECORDING SERVO SYSTEM ADAPTIVE COMBINATION

(71) Applicant: LSI Corporation, San Jose, CA (US)

(72) Inventors: Yu Liao, Longmont, CO (US); Jeffrey P. Grundvig, Longmont, CO (US); Jin Lu, Lafayette, CO (US); Richard Rauschmayer, Longmont, CO (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/259,424

(22) Filed: Apr. 23, 2014

Related U.S. Application Data

(60) Provisional application No. 61/979,401, filed on Apr. 14, 2014.

(51) Int. Cl.
*G11B 5/09* (2006.01)
(52) U.S. Cl.
USPC .................. 360/51; 360/42; 360/48; 360/55; 360/65; 360/75

(58) Field of Classification Search
None
See application file for complete search history.

(56) References Cited

U.S. PATENT DOCUMENTS

| 5,892,632 A * | 4/1999 | Behrens et al. ................. 360/51 |
| 8,456,977 B2 * | 6/2013 | Honma ....................... 369/59.21 |
| 2003/0053245 A1 * | 3/2003 | Ozdemir .................... 360/77.08 |

* cited by examiner

*Primary Examiner* — Muhammad N Edun
(74) *Attorney, Agent, or Firm* — Hamilton DeSanctis & Cha (57) ABSTRACT

A servo system includes multiple interpolators operable to interpolate equalized data for multiple signal paths in a two dimensional magnetic recording system to yield interpolated signals at different phases, scaling circuits operable to scale the interpolated signals by adaptive scaling factors, a signal combining circuit operable to combine the scaled signals, a phase tracking circuit operable to select one of the phases of the combined signal, and an error gradient circuit operable to adapt the adaptive scaling factors.

20 Claims, 5 Drawing Sheets

TWO DIMENSIONAL MAGNETIC RECORDING SERVO SYSTEM ADAPTIVE COMBINATION

CROSS REFERENCE TO RELATED APPLICATIONS

The present application claims priority to (is a non-provisional of) U.S. Pat. App. No. 61/979,401, entitled "Two Dimensional Magnetic Recording Servo System Adaptive Combination", and filed Apr. 14, 2014 by Liao et al, the entirety of which is incorporated herein by reference for all purposes.

FIELD OF THE INVENTION

Various embodiments of the present invention provide systems and methods for adaptive combination of signal paths in a two dimensional magnetic recording servo system.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a current in the head assembly that can be converted to the previously recorded digital data. The location of data on the storage medium is identified by servo data.

SUMMARY

Various embodiments of the present invention provide systems and methods for adaptive combination of signal paths in a two dimensional magnetic recording servo system.

In some embodiments, a servo system includes multiple interpolators operable to interpolate equalized data for multiple signal paths in a two dimensional magnetic recording system to yield interpolated signals at different phases, scaling circuits operable to scale the interpolated signals by adaptive scaling factors, a signal combining circuit operable to combine the scaled signals, a phase tracking circuit operable to select one of the phases of the combined signal, and an error gradient circuit operable to adapt the adaptive scaling factors.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

A two dimensional magnetic recording servo channel with adaptive combination is disclosed herein which improves servo control based on the diversity from multiple read heads. The two dimensional magnetic recording system includes multiple read heads positioned to read a data track. The signals from each of the multiple read heads are phase aligned and combined with adaptive combination prior to servo processing, such as, but not limited to, servo address mark (SAM) detection and Gray code detection. The signals from each of the multiple read heads are scaled or weighted before combining them, with the weights being adapted to channel conditions, improving performance when the read heads have different signal to noise ratio (SNR) values.

In some embodiments, the signals from each of the multiple read heads are filtered, equalized and phase aligned before weighted combination. The combined signal stream is compared to or combined with a reference signal stream to generate an adaptation error gradient. The reference signal can be based on an adapted target or on averaged, phase-shifted, equalized samples. In other words, the adaptation error gradient is generated in some embodiments after the signals are delayed and/or shifted to the same phase domains. The combination weights and the target reference signal are updated based on the error gradients. The phase shifts for the signal stream from each read head are also updated based on the combined signal stream. Due to a short loop latency and no conversion between different phase domain, the adaptation converges rapidly and is robust against channel variations.

Figure 1:
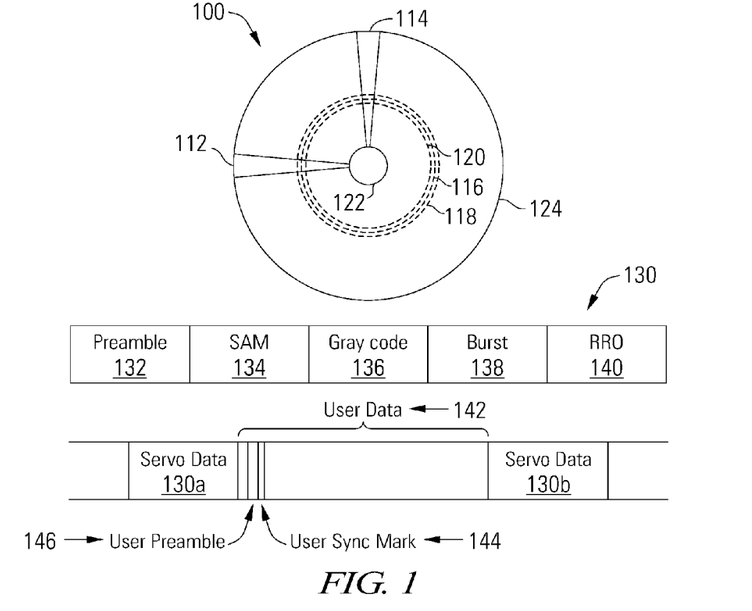
FIG. 1 is a diagram of a magnetic storage medium and sector data scheme that may be used with a two dimensional magnetic recording servo channel with adaptive combination in accordance with some embodiments of the present invention.

Turning to FIG. 1, a diagram of a magnetic storage medium and sector data scheme is shown that can be used with a two dimensional magnetic recording servo channel with adaptive combination in accordance with some embodiments of the present invention. The magnetic storage medium 100 is shown with an example data track 116 and its two adjacent neighboring data tracks 118, 120 on disk platter 124, indicated as dashed lines. The tracks 116, 118, 120 are segregated by servo data written within servo wedges 112, 114. It should be noted that while three tracks 116, 118, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark (SAM) 134, a Gray code 136, a burst field 138, and a repeatable run-out (RRO) field 140. In some embodiments, a servo data set has two or more fields of burst information. It should be noted that different information can be included in the servo fields. Between the servo data bit patterns 130a and 130b, a user data region 142 is provided. User data region 142 can include one or more sets of data that are stored on storage medium 100. The data sets can include user synchronization information, some of which can be used as a mark to establish a point of reference from which processing of the data within user data region 142 may begin.

In operation, storage medium 100 is rotated in relation to a sensor with multiple read heads that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146.

The data processing system that processes some or all of the servo data (e.g., 130) retrieved from servo regions (e.g., 112) is referred to herein as a servo channel. As the servo data (e.g., 130) is processed by the servo channel, signals from multiple read heads in the two dimensional magnetic recording system are produced representing the servo data (e.g., 130). The signals are phase aligned and adaptively combined, yielding a combined servo signal with diversity. Servo address mark and Gray code detection can then be performed on the combined servo signal.

Figure 2:
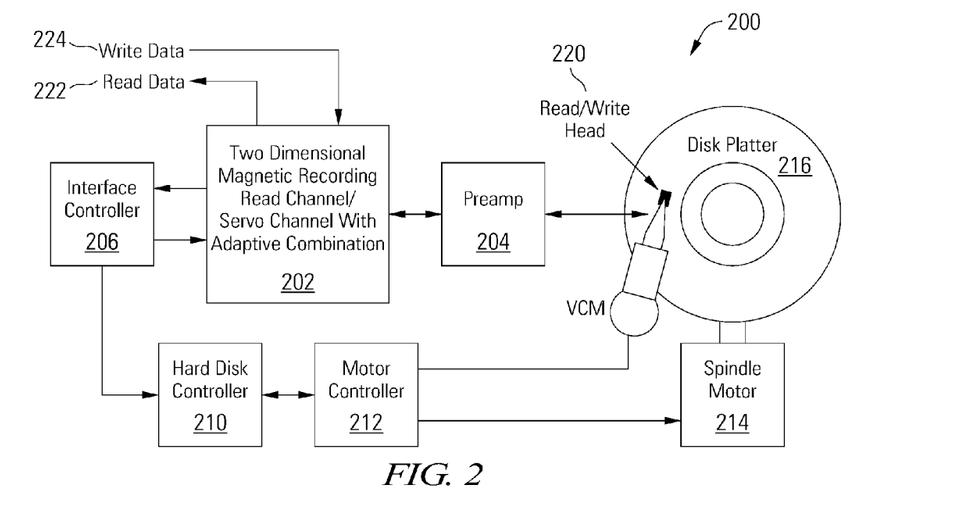
FIG. 2 depicts a storage system including a two dimensional magnetic recording read channel/servo channel with adaptive combination in accordance with some embodiments of the present invention.

Turning to FIG. 2, a storage system 200 is disclosed which includes a read channel/servo channel circuit 202 with adaptive combination in accordance with some embodiments of the present invention. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by read/write head assembly 220 as disk platter 216 is rotated by spindle motor 214. The sensed magnetic signals are provided as a continuous, minute analog signal representative of the magnetic data on disk platter 216. This minute analog signal is transferred from read/write head assembly 220 to read channel circuit 202 via preamplifier 204. Preamplifier 204 is operable to amplify the minute analog signals accessed from disk platter 216. In turn, servo channel circuit 202 processes servo data to correctly position the read/write head assembly 220 over the disk platter 216, and the read channel circuit digitizes and decodes the received analog signal to recreate the information originally written to disk platter 216. This data is provided as read data 222 to a receiving circuit. A write operation is substantially the opposite of the preceding read operation with write data 224 being provided to read channel circuit 202. This data is then encoded and written to disk platter 216. While reading servo data, read channel/servo channel circuit 202 aligns the phase of the signals from each read head in read/write head assembly 220 and adaptively combines the phase aligned signals, enabling servo data processing to be performed on the combined signal, such as, but not limited to, servo address mark detection and Gray code detection. Such adaptive combination can be implemented consistent with that disclosed below in relation to FIGS. 3-5. In some cases, the adaptive combination can be performed consistent with the flow diagram disclosed below in relation to FIG. 6.

It should be noted that in some embodiments storage system 200 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or can be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 200, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 200 is modified to include solid state memory that is used to store data in addition to the storage offered by disk platter 216. This solid state memory may be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Figure 3:
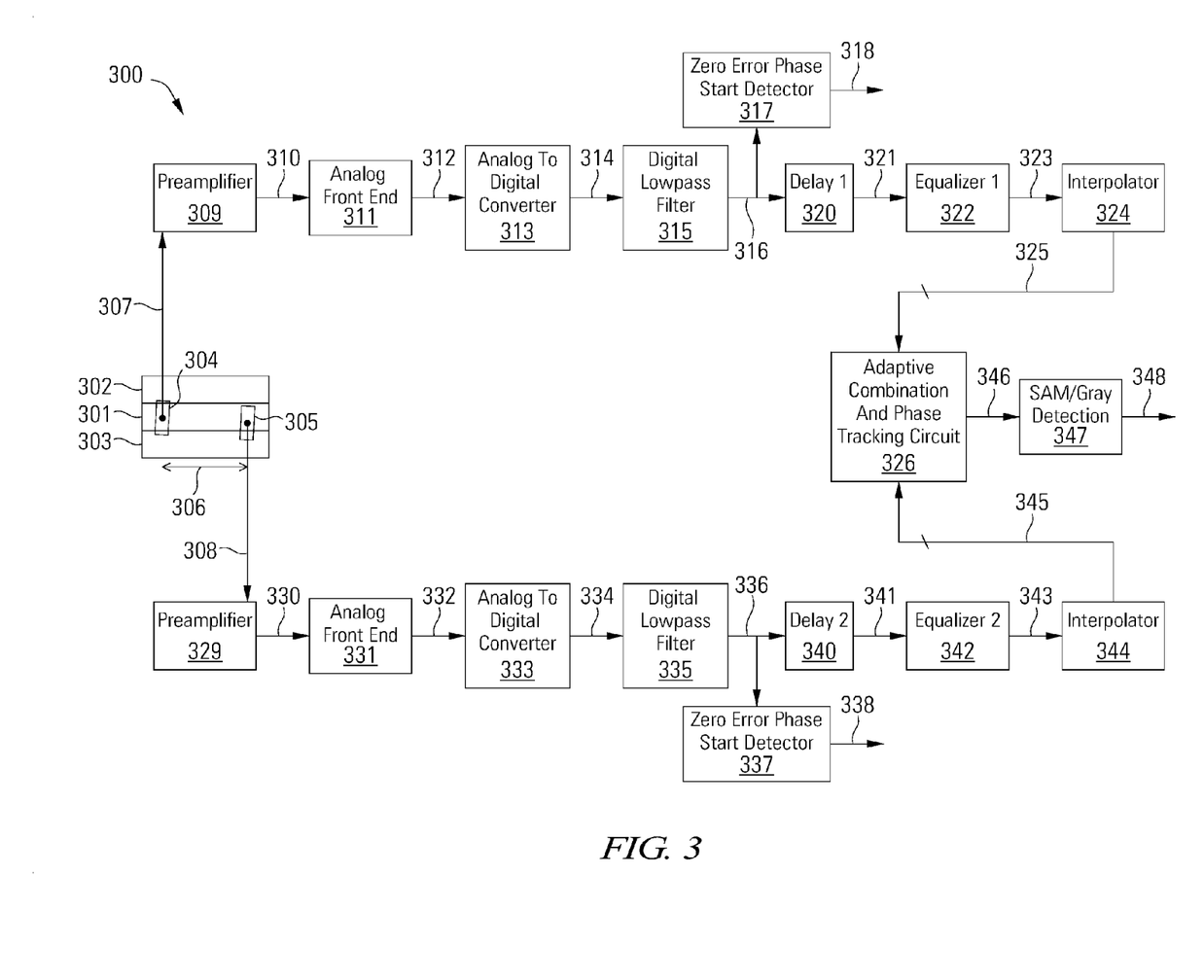
FIG. 3 is a block diagram of a two dimensional magnetic recording servo channel with adaptive combination in accordance with some embodiments of the present invention.

Turning to FIG. 3, a two dimensional magnetic recording servo channel 300 with adaptive combination is depicted in accordance with some embodiments of the present invention. An array reader or sensor includes multiple read heads such as, but not limited to, the two read heads 304, 305 shown in FIG. 3. The read heads 304, 305 are positioned over a target track 301 between side tracks 302, 303. In some embodiments, there is a down track separation 306 between the read heads 304, 305, causing an offset between the signals 307, 308 from the read heads 304, 305. Separate servo channel processing paths are provided for each of the signals 307, 308 from the read heads 304, 305.

Preamplifiers 309, 329 amplify the analog signals 307, 308 from read heads 304, 305, yielding amplified analog signals 310, 330. Analog signals 307, 308 may be, but are not limited to, minute analog electrical signals derived from read heads 304, 305 in a read/write head assembly that is disposed in relation to a storage medium (not shown). Based upon the disclosure provided herein, one of ordinary skill in the art will recognize a variety of sources from which analog signals 307, 308 may be derived. Analog front end circuits 311, 331 receive and process the amplified analog signals 310, 330, providing processed analog signals 312, 332 to analog to digital converter circuits 313, 333. Analog front end circuits 311, 331 may include, but are not limited to, an analog filter and an amplifier circuit as are known in the art. Based upon the disclosure provided herein, one of ordinary skill in the art will recognize a variety of circuitry that may be included as part of analog front end circuits 311, 331.

Analog to digital converter circuits 313, 333 convert processed analog signals 312, 332 into corresponding series of digital samples 314, 334. Analog to digital converter circuits 313, 333 may be any circuits known in the art that are capable of producing digital samples corresponding to analog input signals. Based upon the disclosure provided herein, one of ordinary skill in the art will recognize a variety of analog to digital converter circuits that may be used in relation to different embodiments of the present invention. Digital samples 314, 334 are provided to digital lowpass filters 315, 335, which filter the digital samples 314, 334 in any suitable manner to reduce noise and improve downstream detection. Based upon the disclosure provided herein, one of ordinary skill in the art will recognize a variety of digital lowpass filter circuits that may be used in relation to different embodiments of the present invention.

The filtered digital samples 316, 336 are provided to Zero Error Phase Start (ZPS) detector circuits 317, 337, which calculate estimated starting phases 318, 338 to be selected from interpolators 324, 344. The Zero Error Phase Start detector circuits 317, 337 can calculate the estimated starting phases 318, 338 in any suitable manner, for example based on a sinusoidal pattern (e.g., 00110011) in the preamble field 132 of the servo data. Based upon the disclosure provided herein, one of ordinary skill in the art will recognize a variety of Zero Error Phase Start detector circuits that may be used in relation to different embodiments of the present invention.

The filtered digital samples 316, 336 are also provided to delay circuits 320, 340 which delay the filtered digital samples 316, 336 to correct for integer delays between the signals 307, 308 from the read heads 304, 305, due, for example, to the down track separation 306. In other words, where the period of the signals 307, 308 is T, the delay circuits 320, 340 delay the earlier of the filtered digital samples 316, 336 to correct for phase differences between signals 307, 308 that are integer multiples of T, while the estimated starting phase 318 compensates for sub-T fractional phase differences. The delay circuit 320 delays the filtered digital samples 316 only when they are advanced in relation to the corresponding filtered digital samples 336 from the other read head 305. The delay circuit 340 delays the filtered digital samples 336 only when they are advanced in relation to the corresponding filtered digital samples 316 from the other read head 304. The delay circuits 320, 340 yield digital samples 321, 341 which have at most a sub-T fractional phase difference. Based upon the disclosure provided herein, one of ordinary skill in the art will recognize a variety of delay circuits that may be used in relation to different embodiments of the present invention, such as, but not limited to, flip-flops, latches and logic chains.

The digital samples 321, 341 are provided to equalizer circuits 322, 342. Equalizer circuits 322, 342 apply an equalization algorithm to digital samples 321, 341 to yield equalized outputs 323, 343. In some embodiments of the present invention, equalizer circuits 322, 342 are digital finite impulse response filter circuits as are known in the art. Based upon the disclosure provided herein, one of ordinary skill in the art will recognize a variety of equalizer circuits that may be used in relation to different embodiments of the present invention.

Interpolators 324, 344 receive the equalized outputs 323, 343 and each yield a number of corresponding outputs 325, 345 with different phase offsets. The interpolators 324, 344 can yield any number of different phase signals with any desired resolution based on the implementation complexity and performance tradeoff, such as, but not limited to, 8 outputs at T/8 phase shift intervals, or 32 outputs at T/32 phase shift intervals, etc. In some embodiments, interpolators 324, 344 comprise banks of digital phase interpolators. Interpolators 324, 344 can be any circuits known in the art that are capable of interpolating between digital samples to effectively change the sampling phase in the interpolated outputs 325, 345. Based upon the disclosure provided herein, one of ordinary skill in the art will recognize a variety of interpolation circuits that may be used in relation to different embodiments of the present invention.

An adaptive combination and phase tracking circuit 326 receives the interpolated signals 325, 345, selecting phases of the interpolated signals 325, 345 that are aligned or most nearly aligned, and adaptively weighting and combining the selected phases of the interpolated signals 325, 345 to yield a phase aligned and combined signal 346. In some embodiments, the adaptive combination and phase tracking circuit 326 performs closed loop phase tracking of interpolated signals 325, 345, removing any phase variations that may occur before selecting the phases to be combined. The phase tracking circuit can be any circuit known in the art that is capable of detecting phase changes using closed loop control and stabilizing the phase of the output samples. Based upon the disclosure provided herein, one of ordinary skill in the art will recognize a variety of phase tracking circuits that can be used in relation to different embodiments of the present invention.

A servo address mark/Gray code detector circuit 347 searches for servo address marks and performs Gray code decoding on the phase aligned and combined signal 346. By performing servo processing on the phase aligned and combined signal 346 which includes the diversity of multiple sensor signals, servo control is improved. The servo address mark/Gray code detector circuit 347 is operable in some embodiments to detect values of servo address mark bits and Gray code bits in phase aligned and combined signal 346. In some embodiments, servo address mark/Gray code detector circuit 347 includes a peak detector as is known in the art. Based upon the disclosure provided herein, one of ordinary skill in the art will recognize a variety of data detector circuits that can be used in relation to different embodiments of the present invention. The servo address mark bits and Gray code bits in hard decision output 348 can be used for any suitable purpose, such as, but not limited to, determining whether the read/write head assembly (e.g., 220) is positioned correctly over the disk platter (e.g., 216).

Figure 4:
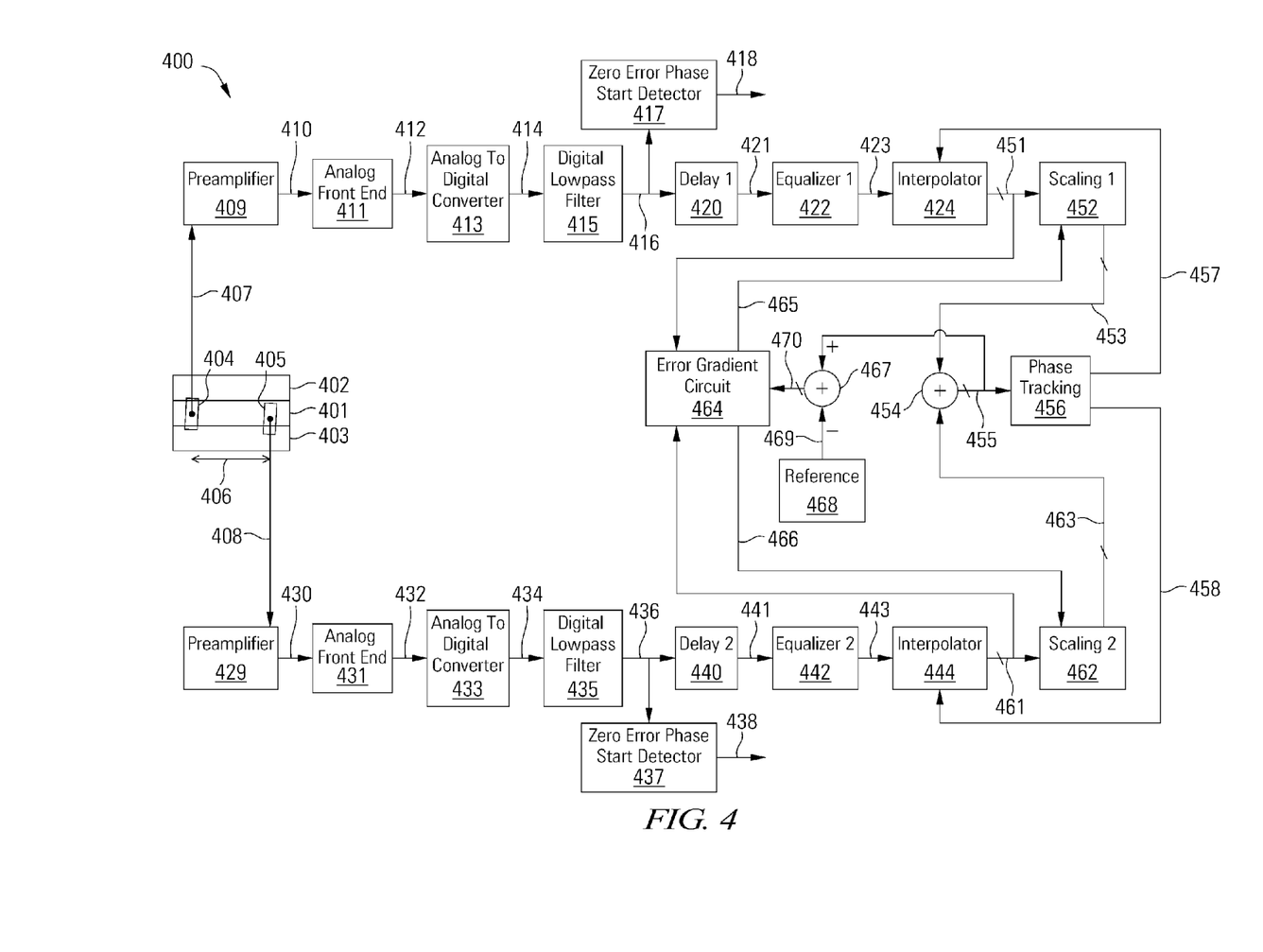
FIG. 4 is a block diagram of a two dimensional magnetic recording servo channel with adaptive combination in accordance with some embodiments of the present invention.

Turning to FIG. 4, a block diagram of a two dimensional magnetic recording servo channel 400 with adaptive combination is shown in accordance with some embodiments of the present invention. The read heads 404, 405 are positioned over a target track 401 between side tracks 402, 403. In some embodiments, there is a down track separation 406 between the read heads 404, 405, causing an offset between the signals 407, 408 from the read heads 404, 405. Separate servo channel processing paths are provided for each of the signals 407, 408 from the read heads 404, 405.

Preamplifiers 409, 429 amplify the analog signals 407, 408 from read heads 404, 405, yielding amplified analog signals 410, 430. Analog signals 407, 408 may be, but are not limited to, minute analog electrical signals derived from read heads 404, 405 in a read/write head assembly that is disposed in relation to a storage medium (not shown). Based upon the disclosure provided herein, one of ordinary skill in the art will recognize a variety of sources from which analog signals 407, 408 may be derived. Analog front end circuits 411, 431 receive and process the amplified analog signals 410, 430, providing processed analog signals 412, 432 to analog to digital converter circuits 413, 433. Analog front end circuits 411, 431 may include, but are not limited to, an analog filter and an amplifier circuit as are known in the art. Based upon the disclosure provided herein, one of ordinary skill in the art will recognize a variety of circuitry that may be included as part of analog front end circuits 411, 431.

Analog to digital converter circuits 413, 433 convert processed analog signals 412, 432 into corresponding series of digital samples 414, 434. Analog to digital converter circuits 413, 433 may be any circuits known in the art that are capable of producing digital samples corresponding to analog input signals. Based upon the disclosure provided herein, one of ordinary skill in the art will recognize a variety of analog to digital converter circuits that may be used in relation to different embodiments of the present invention. Digital samples 414, 434 are provided to digital lowpass filters 415, 435, which filter the digital samples 414, 434 in any suitable manner to reduce noise and improve downstream detection. Based upon the disclosure provided herein, one of ordinary skill in the art will recognize a variety of digital lowpass filter circuits that may be used in relation to different embodiments of the present invention.

The filtered digital samples 416, 436 are provided to Zero Error Phase Start (ZPS) detector circuits 417, 437, which calculate estimated starting phases 418, 438 to be selected from interpolators 424, 444. The Zero Error Phase Start detector circuits 417, 437 can calculate the estimated starting phases 418, 438 in any suitable manner, for example based on a sinusoidal pattern (e.g., 00110011) in the preamble field 132 of the servo data. Based upon the disclosure provided herein, one of ordinary skill in the art will recognize a variety of Zero Error Phase Start detector circuits that may be used in relation to different embodiments of the present invention.

The filtered digital samples 416, 436 are also provided to delay circuits 420, 440 which delay the filtered digital samples 416, 436 to correct for integer delays between the signals 407, 408 from the read heads 404, 405, due, for example, to the down track separation 406. In other words, where the period of the signals 407, 408 is T, the delay circuits 420, 440 delay the earlier of the filtered digital samples 416, 436 to correct for phase differences between signals 407, 408 that are integer multiples of T, while the estimated starting phase 418, 438 compensates for sub-T fractional phase differences. The delay circuit 420 delays the filtered digital samples 416 only when they are advanced in relation to the corresponding filtered digital samples 436 from the other read head 405. The delay circuit 440 delays the filtered digital samples 436 only when they are advanced in relation to the corresponding filtered digital samples 416 from the other read head 404. The delay circuits 420, 440 yield digital samples 421, 441 which have at most a sub-T fractional phase difference. Based upon the disclosure provided herein, one of ordinary skill in the art will recognize a variety of delay circuits that may be used in relation to different embodiments of the present invention, such as, but not limited to, flip-flops, latches and logic chains.

The digital samples 421, 441 are provided to equalizer circuits 422, 442. Equalizer circuits 422, 442 apply an equalization algorithm to digital samples 421, 441 to yield equalized outputs 423, 443. In some embodiments of the present invention, equalizer circuits 422, 442 are digital finite impulse response filter circuits as are known in the art. Based upon the disclosure provided herein, one of ordinary skill in the art will recognize a variety of equalizer circuits that may be used in relation to different embodiments of the present invention.

Interpolators 424, 444 receive the equalized outputs 423, 443 and each yield a number of corresponding outputs 451, 461 with different phase offsets. The interpolators 424, 444 can yield any number of different phase signals with any desired resolution based on the implementation complexity and performance tradeoff, such as, but not limited to, 8 outputs at T/8 phase shift intervals, or 32 outputs at T/32 phase shift intervals, etc. The interpolation phases for the two paths are initially set to estimated starting phases 418, 438 from the Zero Error Phase Start detector circuits 417, 437. In some embodiments, interpolators 424, 444 comprise banks of digital phase interpolators. Interpolators 424, 444 can be any circuits known in the art that are capable of interpolating between digital samples to effectively change the sampling phase in the interpolated outputs 451, 461. Based upon the disclosure provided herein, one of ordinary skill in the art will recognize a variety of interpolation circuits that may be used in relation to different embodiments of the present invention.

Scaling circuits 452, 462 scale the interpolated outputs 451, 461 by adaptive weights 465, 466, yielding scaled signals 453, 463. Scaling circuits 452, 462 can be any circuits known in the art that are capable of scaling digital samples by weighting factors, such as, but not limited to, multipliers. Based upon the disclosure provided herein, one of ordinary skill in the art will recognize a variety of scaling circuits that may be used in relation to different embodiments of the present invention. The adaptive weights 465, 466 are adjusted during operation based on differences between phase adjusted samples and a reference signal. The reference signal can also be adaptively adjusted during operation, either jointly or independently from the weight adaptation.

Combination circuit 454 combines scaled signals 453, 463, yielding combined signals 455. Combination circuit 454 can be any circuit known in the art that is capable of combining multiple digital signals to yield an output digital signal, such as, but not limited to, an adder circuit. In some embodiments, the combination circuit 454 includes a two-input one-output adder for each of the differently phase adjusted output signals from scaling circuits 452, 462. Based upon the disclosure provided herein, one of ordinary skill in the art will recognize a variety of combination circuits that can be used in relation to different embodiments of the present invention.

A phase tracking circuit 456 performs closed loop phase tracking based on the differently phase adjusted signals in the combined signals 455, stabilizing the phase of interpolated samples 451, 461, removing or reducing phase variations that may occur by selecting among the different phases in interpolators 424, 444 as the phases of equalized outputs 423, 443 vary. Phase tracking circuit 456 can be any circuit known in the art that is capable of detecting phase changes using closed loop control and stabilizing the phase of the interpolated samples. Based upon the disclosure provided herein, one of ordinary skill in the art will recognize a variety of phase tracking circuits that can be used in relation to different embodiments of the present invention. In some embodiments, the phase tracking circuit 456 multiple phases in combined signals 455, allowing the phase tracking circuit 456 to control interpolators 424, 444 with signals 457, 458 to remove phase variations from the first and second paths, respectively, such that the two paths are approximately in phase when they are combined. An example of a suitable phase tracking algorithm is disclosed in U.S. patent application Ser. No. 14/243,810, filed Apr. 2, 2014 for a "Two Dimensional Magnetic Recording Servo System Phase Alignment", which is incorporated herein by reference for all purposes.

An error gradient circuit 464 also receives interpolated outputs 451, 461 from interpolators 424, 444, computing adaptive weights 465, 466 to be applied to interpolated outputs 451, 461 in scaling circuits 452, 462. A subtraction circuit 467 subtracts a reference signal 469 from the combined signal 455, yielding an error gradient signal 470. In some embodiments, the reference signal 469 is generated by an adaptive reference circuit 468, either using an adaptive target or averaged equalized and phase shifted interpolated samples 451, 461. In some embodiments, the error gradient signal 470 includes multiple different phases of the same signal, such as, but not limited to, 3 phases. The circuits used to adapt the weights 465, 466 are also collectively referred to herein as a scaling factor adaptation circuit, including, for example, one or more of error gradient circuit 464, subtraction circuit 467, and adaptive reference circuit 468. The operation of the error gradient circuit (e.g., 464) will be described in more detail below.

Figure 5:
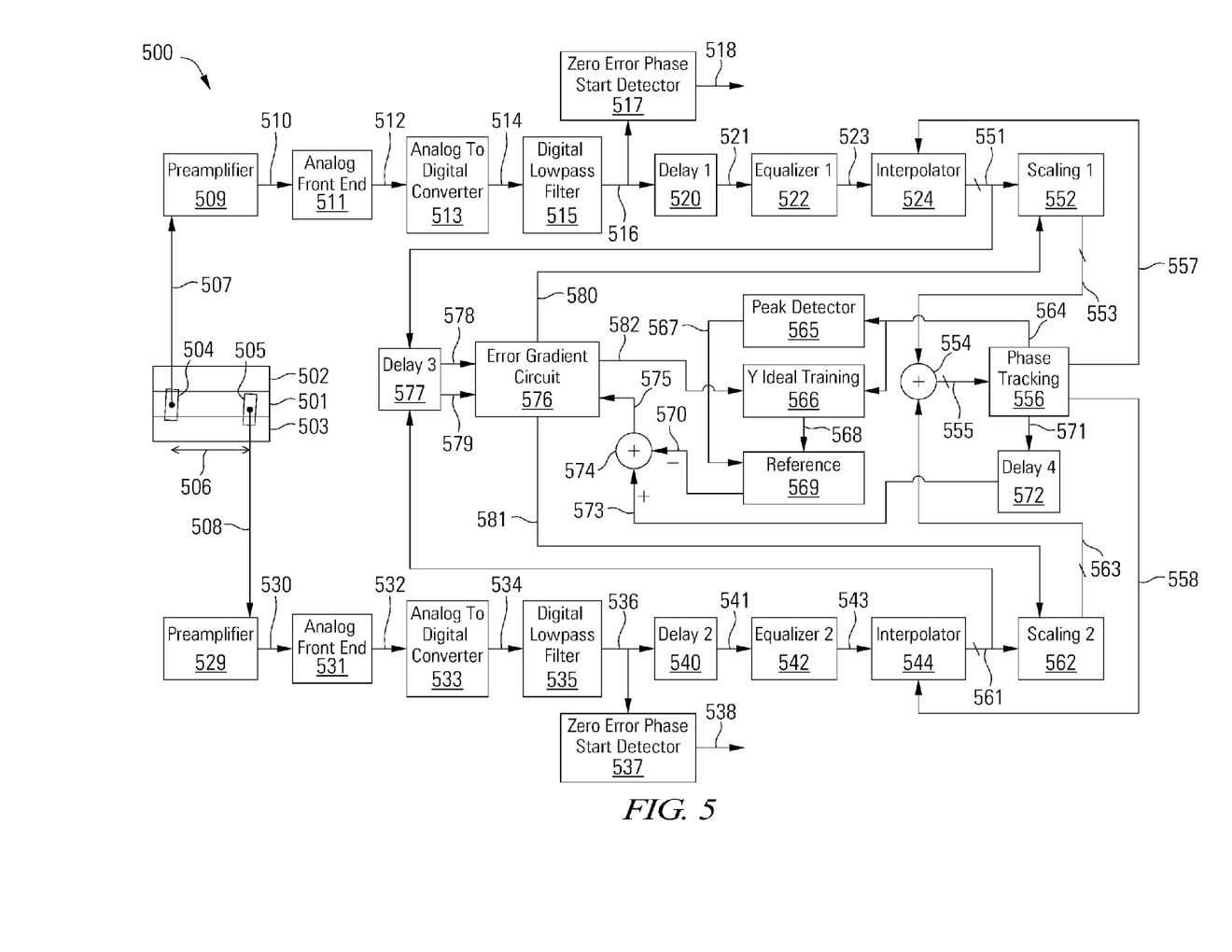
FIG. 5 is a block diagram of a two dimensional magnetic recording servo channel with adaptive combination in accordance with some embodiments of the present invention.

Turning to FIG. 5, another block diagram of a two dimensional magnetic recording servo channel 500 with adaptive combination is shown in accordance with some embodiments of the present invention. The read heads 504, 505 are positioned over a target track 501 between side tracks 502, 503. In some embodiments, there is a down track separation 506 between the read heads 504, 505, causing an offset between the signals 507, 508 from the read heads 504, 505. Separate servo channel processing paths are provided for each of the signals 507, 508 from the read heads 504, 505.

Preamplifiers 509, 529 amplify the analog signals 507, 508 from read heads 504, 505, yielding amplified analog signals 510, 530. Analog signals 507, 508 may be, but are not limited to, minute analog electrical signals derived from read heads 504, 505 in a read/write head assembly that is disposed in relation to a storage medium (not shown). Based upon the disclosure provided herein, one of ordinary skill in the art will recognize a variety of sources from which analog signals 507, 508 may be derived. Analog front end circuits 511, 531 receive and process the amplified analog signals 510, 530, providing processed analog signals 512, 532 to analog to digital converter circuits 513, 533. Analog front end circuits 511, 531 may include, but are not limited to, an analog filter and an amplifier circuit as are known in the art. Based upon the disclosure provided herein, one of ordinary skill in the art will recognize a variety of circuitry that may be included as part of analog front end circuits 511, 531.

Analog to digital converter circuits 513, 533 convert processed analog signals 512, 532 into corresponding series of digital samples 514, 534. Analog to digital converter circuits 513, 533 may be any circuits known in the art that are capable of producing digital samples corresponding to analog input signals. Based upon the disclosure provided herein, one of ordinary skill in the art will recognize a variety of analog to digital converter circuits that may be used in relation to different embodiments of the present invention. Digital samples 514, 534 are provided to digital lowpass filters 515, 535, which filter the digital samples 514, 534 in any suitable manner to reduce noise and improve downstream detection. Based upon the disclosure provided herein, one of ordinary skill in the art will recognize a variety of digital lowpass filter circuits that may be used in relation to different embodiments of the present invention.

The filtered digital samples 516, 536 are provided to Zero Error Phase Start (ZPS) detector circuits 517, 537, which calculate estimated starting phases 518, 538 to be selected from interpolators 524, 544. The Zero Error Phase Start detector circuits 517, 537 can calculate the estimated starting phases 518, 538 in any suitable manner, for example based on a sinusoidal pattern (e.g., 00110011) in the preamble field 132 of the servo data. Based upon the disclosure provided herein, one of ordinary skill in the art will recognize a variety of Zero Error Phase Start detector circuits that may be used in relation to different embodiments of the present invention.

The filtered digital samples 516, 536 are also provided to delay circuits 520, 540 which delay the filtered digital samples 516, 536 to correct for integer delays between the signals 507, 508 from the read heads 504, 505, due, for example, to the down track separation 506. In other words, where the period of the signals 507, 508 is T, the delay circuits 520, 540 delay the earlier of the filtered digital samples 516, 536 to correct for phase differences between signals 507, 508 that are integer multiples of T, while the estimated starting phase 518, 538 compensates for sub-T fractional phase differences. The delay circuit 520 delays the filtered digital samples 516 only when they are advanced in relation to the corresponding filtered digital samples 536 from the other read head 505. The delay circuit 540 delays the filtered digital samples 536 only when they are advanced in relation to the corresponding filtered digital samples 516 from the other read head 504. The delay circuits 520, 540 yield digital samples 521, 541 which have at most a sub-T fractional phase difference. Based upon the disclosure provided herein, one of ordinary skill in the art will recognize a variety of delay circuits that may be used in relation to different embodiments of the present invention, such as, but not limited to, flip-flops, latches and logic chains.

The digital samples 521, 541 are provided to equalizer circuits 522, 542. Equalizer circuits 522, 542 apply an equalization algorithm to digital samples 521, 541 to yield equalized outputs 523, 543. In some embodiments of the present invention, equalizer circuits 522, 542 are digital finite impulse response filter circuits as are known in the art. Based upon the disclosure provided herein, one of ordinary skill in the art will recognize a variety of equalizer circuits that may be used in relation to different embodiments of the present invention.

Interpolators 524, 544 receive the equalized outputs 523, 543 and each yield a number of corresponding outputs 551, 561 with different phase offsets. The interpolators 524, 544 can yield any number of different phase signals with any desired resolution based on the implementation complexity and performance tradeoff, such as, but not limited to, 8 outputs at T/8 phase shift intervals, or 32 outputs at T/32 phase shift intervals, etc. The interpolation phases for the two paths are initially set to estimated starting phases 518, 538 from the Zero Error Phase Start detector circuits 517, 537. In some embodiments, interpolators 524, 544 comprise banks of digital phase interpolators. Interpolators 524, 544 can be any circuits known in the art that are capable of interpolating between digital samples to effectively change the sampling phase in the interpolated outputs 551, 561. Based upon the disclosure provided herein, one of ordinary skill in the art will recognize a variety of interpolation circuits that may be used in relation to different embodiments of the present invention.

Scaling circuits 552, 562 scale the interpolated outputs 551, 561 by adaptive weights 580, 581, yielding scaled signals 553, 563. Scaling circuits 552, 562 can be any circuits known in the art that are capable of scaling digital samples by weighting factors, such as, but not limited to, multipliers. Based upon the disclosure provided herein, one of ordinary skill in the art will recognize a variety of scaling circuits that may be used in relation to different embodiments of the present invention. The adaptive weights 580, 581 are adjusted during operation based on differences between phase adjusted samples and a reference signal. The reference signal can also be adaptively adjusted during operation, either jointly or independently from the weight adaptation.

Combination circuit 554 combines scaled signals 553, 563, yielding combined signals 555. Combination circuit 554 can be any circuit known in the art that is capable of combining multiple digital signals to yield an output digital signal, such as, but not limited to, an adder circuit. In some embodiments, the combination circuit 554 includes a two-input one-output adder for each of the differently phase adjusted output signals from scaling circuits 552, 562. Based upon the disclosure provided herein, one of ordinary skill in the art will recognize a variety of combination circuits that can be used in relation to different embodiments of the present invention.

A phase tracking circuit 556 performs closed loop phase tracking based on the differently phase adjusted signals in the combined signals 555, stabilizing the phase of interpolated samples 551, 561, removing or reducing phase variations that may occur by selecting among the different phases in interpolators 524, 544 as the phases of equalized outputs 523, 543 vary. Phase tracking circuit 556 can be any circuit known in the art that is capable of detecting phase changes using closed loop control and stabilizing the phase of the interpolated samples. Based upon the disclosure provided herein, one of ordinary skill in the art will recognize a variety of phase tracking circuits that can be used in relation to different embodiments of the present invention. In some embodiments, the phase tracking circuit 556 multiple phases in combined signals 555, allowing the phase tracking circuit 556 to control interpolators 524, 544 with signals 557, 558 to remove phase variations from the first and second paths, respectively, such that the two paths are approximately in phase when they are combined. An example of a suitable phase tracking algorithm is disclosed in U.S. patent application Ser. No. 14/243,810, filed Apr. 2, 2014 for a "Two Dimensional Magnetic Recording Servo System Phase Alignment", which is incorporated herein by reference for all purposes.

The phase tracking circuit 556 also yields a combined Y sample stream 564, provided to a peak detector circuit 565 and a Y ideal training circuit 566. The peak detector circuit 556 receives the combined Y sample stream 564 and applies a low latency peak detection algorithm to bi-phase encoded servo data in the combined Y sample stream 564. For example, in some embodiments, the peak detector circuit 556 outputs a 1 in peak signal 567 when the combined Y sample stream 564 is greater than 0 and outputs a 0 when the combined Y sample stream 564 is less than or equal to 0. Based upon the disclosure provided herein, one of ordinary skill in the art will recognize a variety of peak detector circuits that can be used in relation to different embodiments of the present invention. The Y ideal training circuit 566 stores samples from the combined Y sample stream 564 and computes Y ideal values 568 by averaging the last N transitions. In some embodiments, Y ideal values 568 are computed in Y ideal training circuit 566 using a least mean square algorithm. In some embodiments, programmable gain values are applied in the Y ideal value computation. The operation of the Y ideal training circuit 566 will be described in more detail below.

A reference calculation circuit 569 receives the Y ideal values 568 and the peak signal 567 and computes a reference signal 570. In some embodiments, the reference calculation circuit 569 is an adaptive circuit, jointly adapting the reference signal 570 as the weights 580, 581 are adapted. When the reference signal 570 and the weights 580, 581 are adapted, constraints are enabled in some embodiments, such as, but not limited to, direct current (DC) constraints setting the target DC level for the weights 580, 581. The reference signal 570 computed by the reference calculation circuit 569 represents the ideal combined signal from the phase tracking circuit 556, or the ideal result after phase aligning and combining the signals from the multiple read heads. The operation of the reference calculation circuit 569 will be described in more detail below.

A delay circuit 572 delays a combined Y sample stream 571 from the phase tracking circuit 556, matching delays on the combined Y sample stream 564 through the peak detector circuit 565, Y ideal training circuit 566 and reference calculation circuit 569 so that the delayed combined Y sample stream 573 is aligned with the reference signal 570. A delay circuit 577 also delays the interpolated outputs 551, 561, yielding delayed interpolated outputs 578, 579 for each signal path for the multiple read heads, such that the delayed interpolated outputs 578, 579 are aligned with the reference signal 570 and resulting error gradient signal 575. Based upon the disclosure provided herein, one of ordinary skill in the art will recognize a variety of delay circuits that may be used in relation to different embodiments of the present invention, such as, but not limited to, flip-flops, latches and logic chains.

A subtraction circuit 574 subtracts the reference signal 570 from the delayed combined Y sample stream 573, yielding the error gradient signal 575. An error gradient circuit 576 receives the error gradient signal 575 and the delayed interpolated outputs 578, 579, computing adaptive weights 580, 581 to be applied to interpolated outputs 551, 561 in scaling circuits 552, 562. In some embodiments, the error gradient circuit 576 also provides feedback 582 to the Y ideal training circuit 566 to assist in generating ideal Y sample values. The circuits used to adapt the weights 580, 581 are also collectively referred to herein as a scaling factor adaptation circuit, including, for example, one or more of error gradient circuit 576, subtraction circuit 574, peak detector 565, Y ideal training circuit 566 and reference calculation circuit 569. The operation of the scaling factor adaptation circuit will be described in more detail below.

In some embodiments, the adaptation for the weighted combination of multiple signal paths in two dimensional magnetic recording servo system includes the adaptation of weights (e.g., 465, 466, 580, 581) and the adaptation of the reference signal (e.g., 469, 570). The weights (e.g., 465, 466, 580, 581) and the reference signal (e.g., 469, 570) can be adapted jointly or separately, for example being controllable by register settings in or accessible by the error gradient circuit (e.g., 464, 576) and reference calculation circuit (e.g., 468, 569). The adaptation for the weighted combination of multiple signal paths in two dimensional magnetic recording servo system will be described in relation to the servo system of FIG. 5, however, the weighted combination disclosed herein can be implemented in other servo systems such as, but not limited to, that shown in FIGS. 3 and 4.

The combined Y sample stream y(k) at the output of phase tracking circuit 556 (e.g., signals 564, 571) is represented by the following Equation:

$$y(k)=y1(k,P1(k))*w1+y2(k,P2(k))*w2 \quad \text{(Eq 1)}$$

where P1(k) and P2(k) are the best phases of the first and second paths from read heads 504, 505, selected by phase tracking circuit 556, and where $0 \leq P1(k), P2(k) < 8$. The vector [y1(k, 0), y1(k, 1), ..., y1(k,7)] represents the 8 interpolator outputs 551 for the first path and [y2(k, 0), y2(k, 1), ..., y2(k, 7)] the 8 interpolator outputs 561 for the second path.

It can be assumed that y(k) and y(k−4) are two adjacent peaks in combined Y sample stream at the output of phase tracking circuit 556. The peak detector 565 makes decisions D_CURRENT and D_OLD to be provided in peak signal 567 based on y(k) and y(k−4), respectively:

$$D\_CURRENT = \begin{cases} 1, & y(k) > 0 \\ 0, & y(k) \leq 0 \end{cases} \quad \text{(Eq 2)}$$

$$D\_OLD = \begin{cases} 1, & y(k-4) > 0 \\ 0, & y(k-4) \leq 0 \end{cases} \quad \text{(Eq 3)}$$

The Y ideal training circuit 566 generates Y ideal values, selected in the reference calculation circuit 569 based on the old and current decisions in peak signal 567 from peak detector 565. Based on the old and current decisions, the four Y ideal samples selected from the Y ideal values 568 from the Y ideal training circuit 566 are Y_ideal[D_OLD][D_CURRENT][0], Y_ideal[D_OLD][D_CURRENT][1], Y_ideal[D_OLD][D_CURRENT][2], and Y_ideal[D_OLD][D_CURRENT][3]. It is assumed here that Y_ideal[D_OLD][D_CURRENT][3] is the latest sample among the four Y ideal samples.

The adaptation errors or error gradient signal 575 are calculated by subtraction circuit 574 as follows:

$$e0=y(k-0)-Y\_ideal[D\_OLD][D\_CURRENT][3]$$

$$e1=y(k-1)-Y\_ideal[D\_OLD][D\_CURRENT][2]$$

$$e2=y(k-2)-Y\_ideal[D\_OLD][D\_CURRENT][1]$$

$$e3=y(k-3)-Y\_ideal[D\_OLD][D\_CURRENT][0] \quad \text{(Eq 4)}$$

In some embodiments, the error gradient circuit 576 saturates the adaptation errors to be within the range [−7,7] and represents e0, e1, e2, e3 as 4-bit 2's complement numbers. Weight adaptation errors are accumulated in the error gradient circuit 576 in a memory, such as, but not limited to, using two 22-bit weight accumulation registers W1_ACCUM[21: 0] and W2_ACCUM[21:0] using 22-bit 2's complement numbers. The accumulation is performed as follows in some embodiments:

$$W1\_reg\_new=W1\_reg\_current-WUG*err1$$

$$W2\_reg\_new=W2\_reg\_current-WUG*err2 \quad \text{(Eq 5)}$$

where W1_reg_current represents the accumulated weight currently in the register W1_ACCUM, W2_reg_current represents the accumulated weight currently in the register W2_ACCUM, W1_reg_new represents the updated accumulation to be fed into the register W1_ACCUM in the next clock cycle, and W2_reg_new represents the updated accumulation to be fed into the register W2_ACCUM in the next clock cycle. The values W1_reg_current, W1_reg_new, W2_reg_current and W2_reg_new are saturated to be within the range $[-2^{21}, 2^{21}-1]$. WUG is the weight update gain which in some embodiments has 8 programmable values [¼, ½, 1, 2, 4, 8, 16, 32], selectable for example using a control register.

$$err1=e0*y1(k)+e1*y1(k-1)+e2*y1(k-2)+e3*y1(k-3)$$

$$err2=e0*y2(k)+e1*y2(k-1)+e2*y2(k-2)+e3*y2(k-3) \quad \text{(Eq 6)}$$

where y1(k)=y1(k,P1(k)) and y2(k)=y2(k,P2(k)) as in Equation 1. The adaptive weights 580, 581 computed by error gradient circuit 576, which in some embodiments are 8-bit weights, are obtained from the truncation of the last 14 least significant bits (LSBs) of the values in the weight accumulation registers W1_ACCUM and W2_ACCUM:

$$W1=W1\_ACCUM[21:14]$$

$$W2=W2\_ACCUM[21:14] \quad \text{(Eq 7)}$$

In some embodiments, a DC constraint is applied in error gradient circuit 576 to make the weight adaptation stable and robust in certain conditions. Let DC_w represent the target DC level, represented as an 8-bit 2's complement number, for the weights 580, 581. The DC constraint is applied as follows:

$$DC\_delta=W1+W2-DC\_w$$

$$DC\_delta=DC\_delta/2$$

$$W1=W1-DC\_delta$$

$$W2=W2-DC\_delta \quad \text{(Eq 8)}$$

where the division of DC_delta by 2 is implemented in some embodiments by truncating the least significant bit, a register DC[7:0] is used to store the target DC, the DC constraint is enabled by setting a value in a control register, and the 8-bit weights W1 and W2 are stored in registers W1[7:0] and W2[7:0], respectively.

The Y ideal adaptation performed in some embodiments of a Y ideal training circuit (e.g., 566) can be enabled by setting a value in a control register. When the weighted combination is enabled, the Y ideal training circuit 566 adapts the Y ideal samples based at least in part on the combined Y sample stream 564 from phase tracking circuit 556. Let Y_ideal[i][j][k] represent the trained Y ideal values corresponding to transitions i→j, where i,j∈{0,1} and k∈{0, 1, 2, 3}.

The Y ideal adaptation can be performed in one or more of a number of adaptation modes in various embodiments. In a first Y ideal adaptation mode, Y_ideal_current[i][j][k] represents the current Y ideal values and Y_ideal_new[i][j][k] represents the Y ideal values from averaging the previous N transitions of i→j in Y ideal training circuit 566. (Notably, the adaptation and weight computation functions disclosed herein can be performed in the circuit blocks as shown in FIG. 5, or the functions can be distributed in various other manners to achieve the same result. For example, the Y ideal adaptation can be performed in the Y ideal training circuit 566, in the reference calculation circuit 569, in a combination of the two or elsewhere, as desired.) The Y ideal adaptation is applied as:

$$Y\_ideal[i][j][k] = Y\_ideal\_current[i][j][k] + YUG*Y\_diff$$

$$Y\_diff = Y\_ideal\_new[i][j][k] - Y\_ideal\_current[i][j][k]$$

$$Y\_ideal\_current[i][j][k] = Y\_ideal[i][j][k] \quad \text{(Eq 9)}$$

where YUG is the Y ideal update gain with programmable values [1/16, 1/8, 1/4, 1/2, 1], selectable for example using a control register. The multiplication YUG*Y_diff can be implemented as a truncation of the least significant bits of Y_diff.

In a second Y ideal adaptation mode, the adaptation is based on Equations 4 as follows:

$$Y\_reg\_new[i][j][0] = Y\_reg\_current[i][j][0] + YUG\_LMS*e3$$

$$Y\_reg\_new[i][j][1] = Y\_reg\_current[i][j][1] + YUG\_LMS*e2$$

$$Y\_reg\_new[i][j][2] = Y\_reg\_current[i][j][2] + YUG\_LMS*e1$$

$$Y\_reg\_new[i][j][3] = Y\_reg\_current[i][j][3] + YUG\_LMS*e0 \quad \text{(Eq 10)}$$

where e0, e1, e2, e3 are the saturated adaptation errors in Equations 4, i and j are the old and current decisions as in Equation 2-3, Y_reg_current[i][j][k] is the current value of the Y ideal accumulation register that is used to accumulate the adaptation error for the transition i→j, Y_reg_new is the updated register value, and YUG_LMS is the update gain of the least mean squares (LMS) Y ideal adaptation with programmable values [1, 2, 4, 8, 16, 32, 64], selectable by a value in a control register.

In some embodiments, each Y ideal accumulation register has 14 bits and the register value is a 14-bit 2's complement number. There are a total of 16 such registers Y_ACCUM0 [13:0], Y_ACCUM1[13:0], . . . , Y_ACCUM15[13:0] corresponding to the total 16 Y ideal values of the 4 possible transitions. The 8-bit Y ideal values Y_ideal[i][j][k] in Equations 4 and 9 are obtained from the truncation of the last 6 LSBs of the register values. For example, $$Y\_ideal[0][0][0] = ACCUM0[13:7] \quad \text{(Eq 11)}$$

In this adaptation mode, the Y ideal training circuit 566 is only enabled during a calibration stage to obtain the initial Y ideal values. After initialization, the Y ideal adaptation is carried out with Equations 10.

A third Y ideal adaptation mode is a combination of the first and second Y ideal adaptation modes. After the Y ideal update using Equations 9, the Y ideal accumulation register values in Equations 10 are also updated as follows:

$$Y\_reg\_current[i][j][k] = Y\_ideal\_current[i][j][k]*64 \quad \text{(Eq 12)}$$

meaning that the corresponding 14-bit Y ideal accumulation registers are updated using Equation 12 with the Y ideal values from Equations 9, once the transition pattern counts reach the update threshold defined by the Y ideal training circuit 566. During the interval of updates from the Y ideal training circuit 566, the Y ideal values are adapted using Equations 10 and 11.

Figure 6:
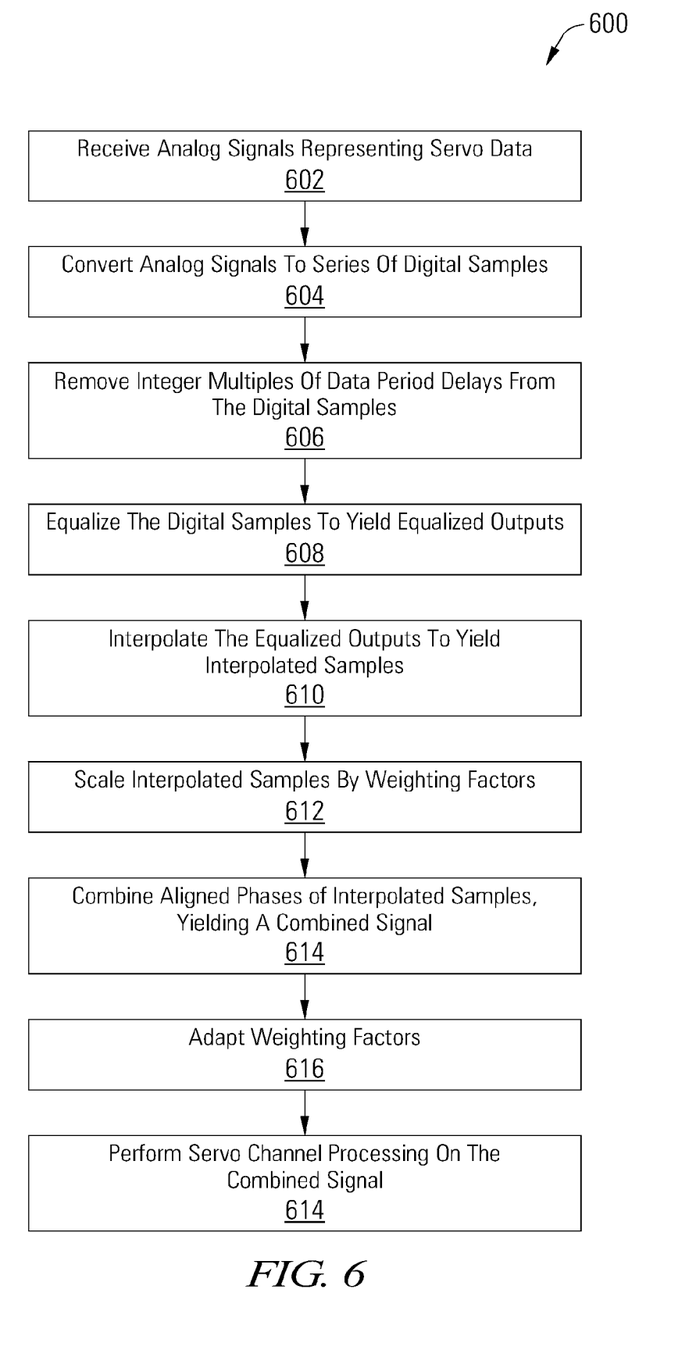
FIG. 6 is a flow diagram showing a method for servo channel processing with adaptive combination in a two dimensional magnetic recording servo channel in accordance with some embodiments of the present invention.

Turning to FIG. 6, a flow diagram 600 shows a method for servo channel processing with adaptive combination in a two dimensional magnetic recording servo channel in accordance with some embodiments of the present invention. Following flow diagram 600, analog signals representing servo data are received. (Block 602) Any number of analog signals can be received, based on the number of read heads in the array reader. The analog signals are converted to series of digital samples. (Block 604) Integer multiples of data period delays are removed from the series of digital samples. (Block 606) The resulting servo channels have only sub-T phase differences. The digital samples are equalized to yield equalized outputs. (Block 608) The equalized outputs are interpolated to yield interpolated samples. (Block 610) The interpolated samples are scaled by weighting factors. (Block 612) Phases of aligned interpolated and scaled samples from each read head are combined, yielding a combined signal. (Block 614) Weighting factors are adapted for subsequent samples. (Block 616) Servo channel processing is then performed on the combined signal, such as, but not limited to, servo address mark detection and Gray code decoding. (Block 618)

It should be noted that the various blocks shown in the drawings and discussed herein may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel adaptive combination of servo signals in a two dimensional magnetic recording servo system. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A servo system comprising:
 a first interpolator operable to interpolate first equalized data to yield a plurality of first interpolated signals at different phases;
 a second interpolator operable to interpolate second equalized data to yield a plurality of second interpolated signals at different phases;
 a first scaling circuit operable to scale the plurality of first interpolated signals by a first adaptive scaling factor to yield a plurality of first scaled signals;
 a second scaling circuit operable to scale the plurality of second interpolated signals by a second adaptive scaling factor to yield a plurality of second scaled signals;
 a signal combining circuit operable to combine the plurality of first scaled signals and the plurality of second scaled signals to yield a plurality of combined signals;
 a phase tracking circuit operable to select among the plurality of combined signals to yield a combined servo data signal; and a scaling factor adaptation circuit operable to control the first adaptive scaling factor and the second adaptive scaling factor.

2. The servo system of claim 1, wherein the first equalized data and the second equalized data are derived from a first read head and a second read head positioned to read a same data track.

3. The servo system of claim 1, further comprising a servo address mark detector circuit operable to detect a servo address mark in the combined servo data signal.

4. The servo system of claim 1, wherein the scaling factor adaptation circuit comprises an error gradient circuit operable to calculate the first adaptive scaling factor and the second adaptive scaling factor based at least in part on the plurality of first interpolated signals and plurality of second interpolated signals.

5. The servo system of claim 4, wherein the scaling factor adaptation circuit further comprises a reference calculation circuit operable to calculate a reference signal based at least in part on ideal samples for a combined signal path.

6. The servo system of claim 5, wherein the scaling factor adaptation circuit further comprises a subtraction circuit operable to subtract the reference signal from the combined servo data signal to yield an adaptation error signal, wherein the error gradient circuit operable to calculate the first adaptive scaling factor and the second adaptive scaling factor based at least in part on the adaptation error signal.

7. The servo system of claim 5, wherein the scaling factor adaptation circuit further comprises a peak detection circuit operable to detect peaks in the combined servo data signal.

8. The servo system of claim 7, wherein the scaling factor adaptation circuit further comprises an ideal sample training circuit operable to calculate the ideal samples for the combined signal path.

9. The servo system of claim 8, wherein the reference calculation circuit is operable to calculate the reference signal based at least in part on the detected peaks.

10. The servo system of claim 1, further comprising a first equalizer circuit operable to filter digital servo data samples derived from a first read head to yield the first equalized data, and further comprising a second equalizer circuit operable to filter digital servo data samples derived from a second read head to yield the second equalized data.

11. The servo system of claim 10, further comprising:
a first digital lowpass filter operable to filter the digital servo data samples derived from the first read head prior to equalization; and
a second digital lowpass filter operable to filter the digital servo data samples derived from the second read head prior to equalization.

12. The servo system of claim 11, further comprising:
a first zero error phase start detector circuit operable to detect an initial phase offset selected in the first interpolator based on an output of the first digital lowpass filter; and
a second zero error phase start detector circuit operable to detect an initial phase offset selected in the second interpolator based on an output of the second digital lowpass filter.

13. The servo system of claim 11, further comprising:
a first delay circuit operable to delay the digital servo data samples derived from the first read head by an integer multiple of a sample period when the digital servo data samples derived from the first read head are advanced by at least a full sample period over the digital servo data samples derived from the second read head; and a second delay circuit operable to delay the digital servo data samples derived from the second read head by an integer multiple of a sample period when the digital servo data samples derived from the second read head are advanced by at least a full sample period over the digital servo data samples derived from the first read head.

14. The servo system of claim 11, wherein the first read head and the second read head comprise an array reader in a two dimensional magnetic recording system.

15. The servo system of claim 1, wherein the first and second interpolators, first and second scaling circuits, signal combining circuit, phase tracking circuit and scaling factor adaptation circuit are embodied in an integrated circuit.

16. The servo system of claim 1, wherein the servo system is embodied in a storage system.

17. A method for adaptive combination in a two dimensional magnetic recording servo channel, comprising:
interpolating a first servo signal derived from a first read head to yield first interpolated signals at a plurality of different phase offsets;
interpolating a second servo signal derived from a second read head to yield second interpolated signals at a plurality of different phase offsets;
scaling the first interpolated signals with a first adaptive scaling factor to yield first scaled signals;
scaling the second interpolated signals with a second adaptive scaling factor to yield second scaled signals;
selecting and combining most nearly phase aligned signals of the first scaled signals and the second scaled signals to yield a combined servo signal; and
adapting the first adaptive scaling factor and the second adaptive scaling factor based at least in part on the combined servo signal.

18. The method of claim 17, wherein adapting the first adaptive scaling factor and the second adaptive scaling factor comprises adapting ideal sample values.

19. The method of claim 17, further comprising applying direct current constraints when adapting the first adaptive scaling factor and the second adaptive scaling factor.

20. A storage device, comprising:
a storage medium operable to store user data and servo data;
a head assembly disposed in relation to the storage medium and operable to read and write data on the storage medium; and
a servo system operable to combine signals from a plurality of read heads, the servo system comprising:
an interpolator for each of the plurality of read heads, each yielding a plurality of interpolated signals at different phases;
a scaling circuit for each of the plurality of read heads, operable to scale the interpolated signals by adaptive scaling factor to yield scaled signals;
a signal combining circuit operable to combine the scaled signals corresponding to each of the plurality of read heads to yield a plurality of combined signals with different phases;
a phase tracking circuit operable to select one phase of the plurality of combined signals as an output combined servo signal; and
a scaling factor adaptation circuit operable to control the adaptive scaling factors.

* * * * *